United States Patent
Chhabra et al.

(10) Patent No.: US 12,136,225 B2
(45) Date of Patent: Nov. 5, 2024

(54) CLOG DETECTION VIA IMAGE ANALYTICS

(71) Applicant: Applied Materials, Inc., Santa Clara, CA (US)

(72) Inventors: Yash Chhabra, Bangalore (IN); Abyaya Dhar, Bangalore (IN); Boon Sen Chan, Singapore (SG); Yenwei Hung, Taoyuan (TW); Sidda Reddy Kurakula, Bengaluru (IN); Chandrasekhar Roy, Bangalore (IN); Chih Chuan Wang, Hsinchu (TW)

(73) Assignee: Applied Materials, Inc., Santa Clara, CA (US)

( * ) Notice: Subject to any disclaimer, the term of this patent is extended or adjusted under 35 U.S.C. 154(b) by 119 days.

(21) Appl. No.: 17/941,914

(22) Filed: Sep. 9, 2022

(65) Prior Publication Data
US 2024/0087135 A1   Mar. 14, 2024

(51) Int. Cl.
*G06T 7/00* (2017.01)
*G06T 7/194* (2017.01)

(52) U.S. Cl.
CPC ............ *G06T 7/194* (2017.01); *G06T 7/0004* (2013.01); *G06T 2207/20081* (2013.01); *G06T 2207/30164* (2013.01)

(58) Field of Classification Search
CPC .................. G06T 7/194; G06T 7/0004; G06T 2207/20081; G06T 2207/30164
See application file for complete search history.

(56) References Cited

U.S. PATENT DOCUMENTS

| | | | | |
|---|---|---|---|---|
| 4,797,939 A | * | 1/1989 | Hoki | G01N 21/956 348/126 |
| 5,389,954 A | * | 2/1995 | Inaba | B23K 26/043 347/258 |
| 7,679,746 B1 | * | 3/2010 | Walton | G01N 15/088 356/432 |
| 9,310,312 B2 | | 4/2016 | Jahnke et al. | |

(Continued)

FOREIGN PATENT DOCUMENTS

| KR | 20220105770 A | 7/2022 |
|---|---|---|
| WO | 2021043936 A1 | 3/2021 |

OTHER PUBLICATIONS

International Search Report and Written Opinion for International Application No. PCT/US2023/032109, mailed Dec. 20, 2023, 8 pages.

*Primary Examiner* — Aaron W Carter
(74) *Attorney, Agent, or Firm* — Lowenstein Sandler LLP

(57) ABSTRACT

A method includes identifying an image of a substrate processing equipment part that forms a plurality of holes. The method further includes determining, by a processing device based on the image, a corresponding neighboring angular distance of each of the plurality of holes and a corresponding area of each of the plurality of holes. The method further includes identifying, by the processing device, a first subset of the plurality of holes that are at least partially clogged based on at least one of the corresponding neighboring angular distance or the corresponding area of each of the plurality of holes. A corrective action associated with the substrate processing equipment part is to be performed based on the first subset of the plurality of holes that are at least partially clogged.

20 Claims, 8 Drawing Sheets

(56) References Cited

U.S. PATENT DOCUMENTS

| | | | |
|---|---|---|---|
| 11,407,067 B2* | 8/2022 | Turcotte | B23K 26/705 |
| 2002/0051563 A1* | 5/2002 | Goto | G01N 21/94 |
| | | | 382/141 |
| 2003/0206651 A1* | 11/2003 | Goto | G01N 21/95692 |
| | | | 382/152 |
| 2012/0092681 A1* | 4/2012 | Cox | G02B 13/22 |
| | | | 356/626 |
| 2015/0190890 A1* | 7/2015 | Ozturk | B26F 1/26 |
| | | | 408/1 R |
| 2018/0103247 A1 | 4/2018 | Kolchin et al. | |
| 2019/0033232 A1 | 1/2019 | Ahn et al. | |
| 2020/0161081 A1* | 5/2020 | Pathangi | H01J 37/28 |
| 2021/0407831 A1 | 12/2021 | Sunugatov et al. | |
| 2023/0014823 A1* | 1/2023 | Cheng | G06T 7/149 |
| 2024/0038488 A1* | 2/2024 | Kumar | H01J 37/261 |

* cited by examiner

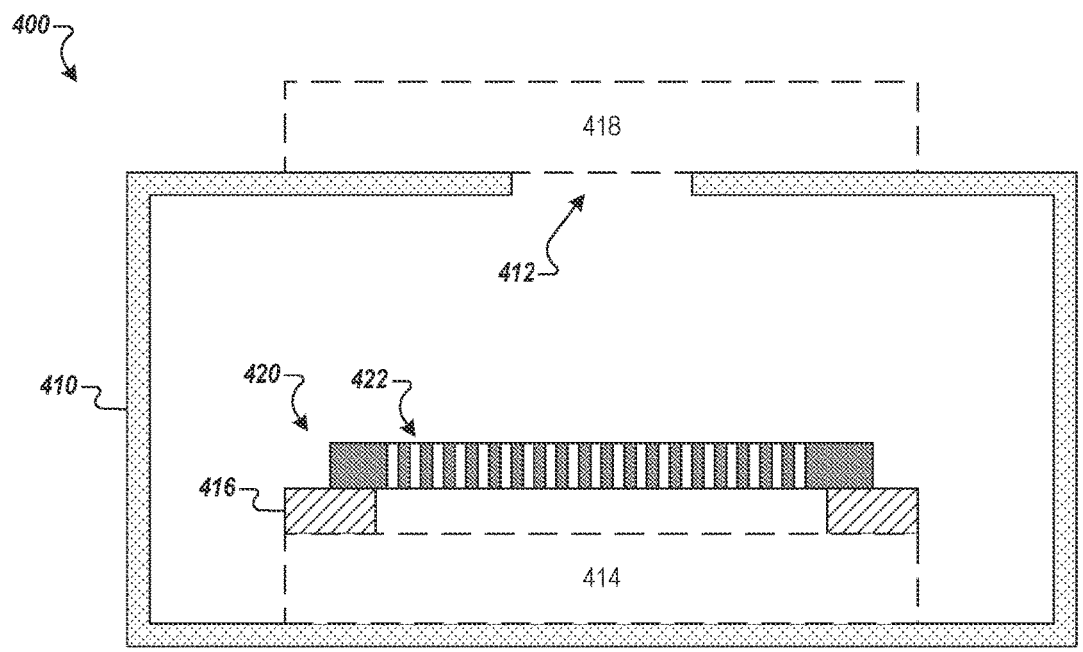
FIG. 4A
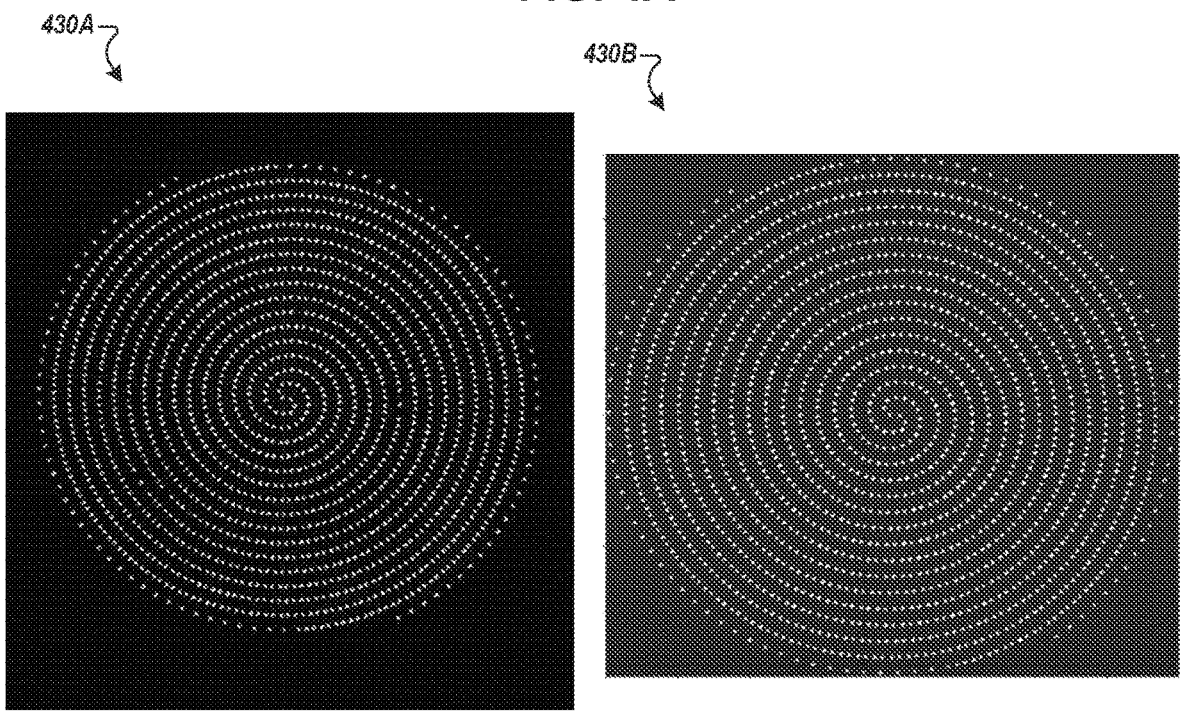
FIG. 4B
FIG. 4C

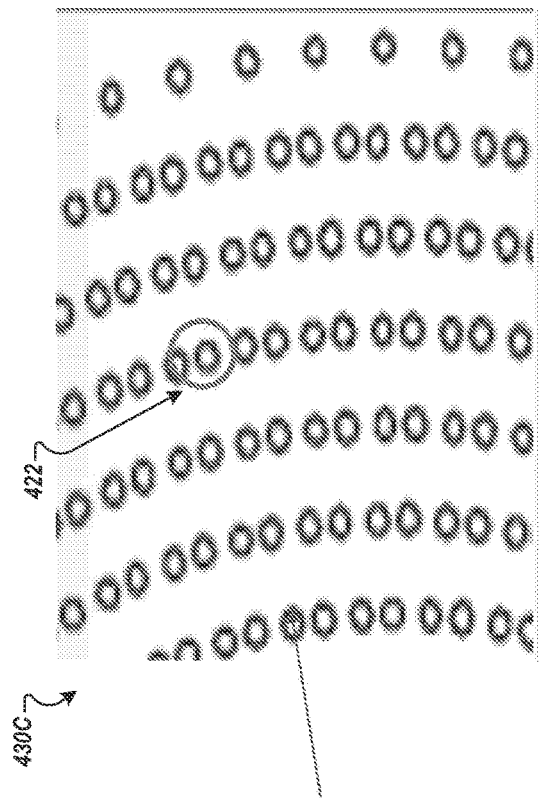
FIG. 4E
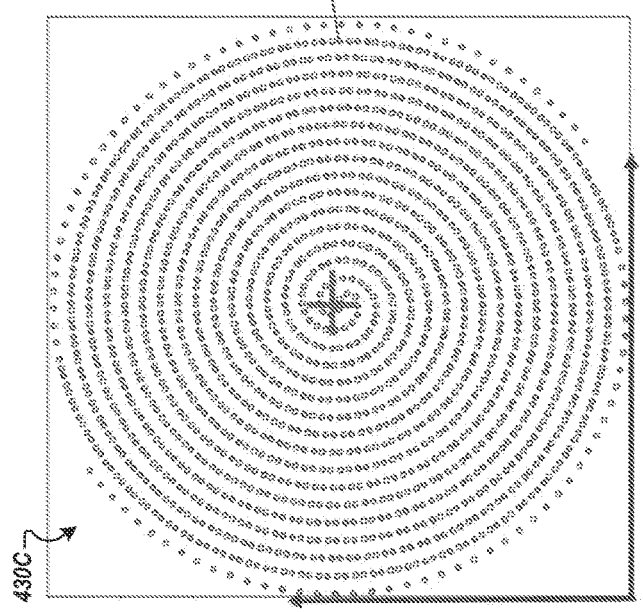
FIG. 4D
FIG. 4F
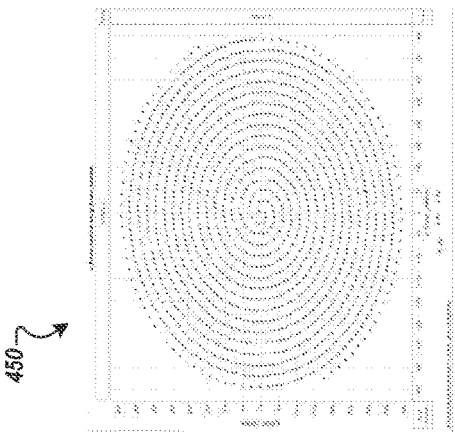
FIG. 4H
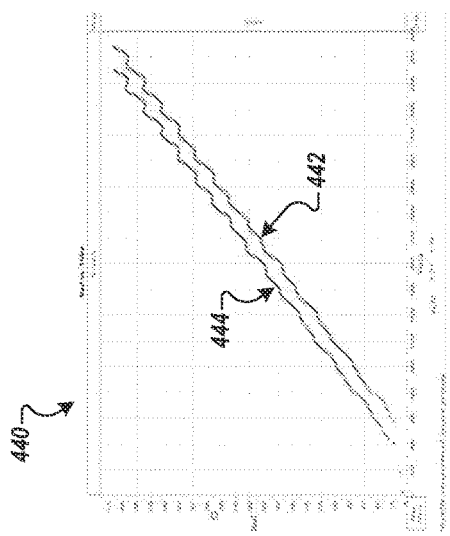
FIG. 4G
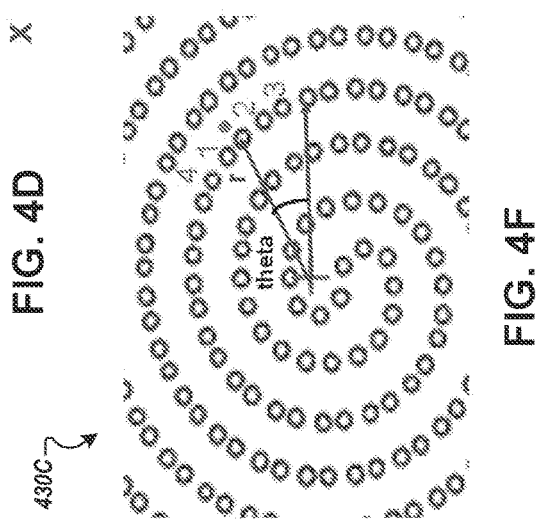

(12) United States Patent

CLOG DETECTION VIA IMAGE ANALYTICS

TECHNICAL FIELD

The present disclosure relates to image analytics, and, more particularly, clog detection via image analytics.

BACKGROUND

Manufacturing equipment include different parts that are used to produce products. For example, substrate processing equipment includes parts that are used to produce substrates. The quality and cleanliness of the parts affects the performance data of the products.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes identifying an image of a substrate processing equipment part that forms a plurality of holes. The method further includes determining, by a processing device based on the image, a corresponding neighboring angular distance of each of the plurality of holes and a corresponding area of each of the plurality of holes. The method further includes identifying, by the processing device, a first subset of the plurality of holes that are at least partially clogged based on at least one of the corresponding neighboring angular distance or the corresponding area of each of the plurality of holes. A corrective action associated with the substrate processing equipment part is to be performed based on the first subset of the plurality of holes that are at least partially clogged.

In another aspect of the disclosure, a non-transitory computer-readable storage medium storing instructions which, when executed, cause a processing device to perform operations. The operations include identifying an image of a substrate processing equipment part that forms a plurality of holes. The operations further include determining, based on the image, a corresponding neighboring angular distance of each of the plurality of holes and a corresponding area of each of the plurality of holes. The operations further include identifying a first subset of the plurality of holes that are at least partially clogged based on at least one of the corresponding neighboring angular distance or the corresponding area of each of the plurality of holes. A corrective action associated with the substrate processing equipment part is to be performed based on the first subset of the plurality of holes that are at least partially clogged.

In another aspect of the disclosure, a system includes a memory and a processing device coupled to the memory. The processing device is to identify an image of a substrate processing equipment part that forms a plurality of holes. The processing device is further to determine, based on the image, a corresponding neighboring angular distance of each of the plurality of holes and a corresponding area of each of the plurality of holes. The processing device is further to identify a first subset of the plurality of holes that are at least partially clogged based on at least one of the corresponding neighboring angular distance or the corresponding area of each of the plurality of holes. A corrective action associated with the substrate processing equipment part is to be performed based on the first subset of the plurality of holes that are at least partially clogged.

BRIEF DESCRIPTION OF THE DRAWINGS

The present disclosure is illustrated by way of example, and not by way of limitation in the figures of the accompanying drawings.

FIG. 4A illustrates an image capturing device, according to certain embodiments.

FIGS. 4B-C illustrate an image of a substrate processing equipment part, according to certain embodiments.

FIGS. 4D-F illustrate contours of holes from an image of a substrate processing equipment part, according to certain embodiments.

FIG. 4G illustrates mapping of the nearest neighbor holes of a substrate processing equipment part, according to certain embodiments.

FIG. 4H illustrates mapping hole spirals of a substrate processing equipment part, according to certain embodiments.

DETAILED DESCRIPTION

Figure 1:
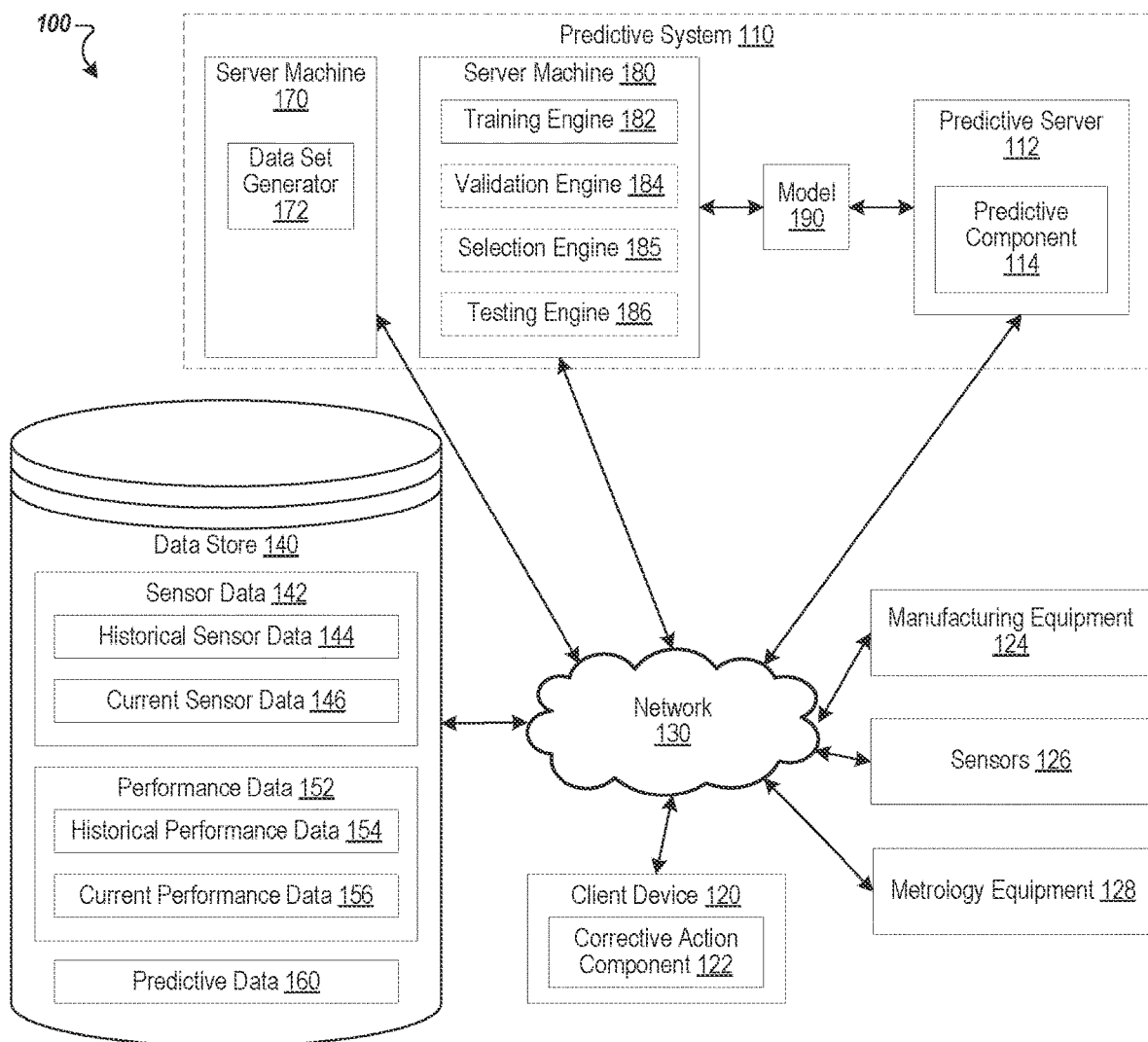
FIG. 1 is a block diagram illustrating an exemplary system architecture, according to certain embodiments.

Described herein are technologies directed to clog detection via image analytics (e.g., showerhead clog detection from backlight image using image analytics).

Manufacturing equipment include different parts that are used to produce products. For example, substrate processing equipment includes parts that are used to produce substrates. Some parts, such as showerheads, susceptors, etc., form holes (e.g., channels from an upper surface to a lower surface) to provide fluid (e.g., gas, liquid, plasma) to portions of the substrate processing system. The quality and cleanliness of the parts affect the performance data of the products. For example, completely or partially clogged holes of parts can cause substrates to be produced with performance data that does not meet threshold values (e.g., produce bad wafers).

In some conventional systems, parts are manually inspected to attempt to determine if the parts meet quality and cleanliness to produce substrates that have performance data that meet threshold values. Manual inspection takes a lot of time, depends on the user that is performing the inspection, and can be inaccurate.

In some conventional systems, parts undergo cleaning procedures at set intervals to attempt to cause the parts to produce substrates that have performance data that will meet threshold values. Over time, parts become unclean, become damaged, become worn down, have foreign material lodged in holes, etc. which is not resolved by conventional cleaning procedures at set intervals. This causes production of substrates that have performance data that does not meet threshold values, damage of equipment, lower throughput, interruption of production, etc.

The devices, systems, and methods disclosed herein provide clog detection via image analytics.

A processing device identifies an image of a substrate processing equipment part that forms holes. In some examples, the substrate processing equipment part is a showerhead that has an upper surface and a lower surface that are substantially planar and are substantially parallel to each other. The holes (e.g., channels) may be formed from the upper surface to the lower surface. The holes (e.g., central axis of the channels) may be at an angle (e.g., 2-8 degree angle) compared to the upper surface and/or the lower surface. The image may be captured of one surface (e.g., upper surface) while providing light to the opposite surface (e.g., lower surface) so that light is provided through the unclogged holes (e.g., a backlight image).

In some embodiments, the processing device determines, based on the image, a corresponding neighboring angular distance of each of the holes and a corresponding area of each of the holes.

The processing device identifies a first subset of the holes that are at least partially clogged based on at least one of the corresponding neighboring angular distance or the corresponding area of each of the holes. A corrective action associated with the substrate processing equipment part is to be performed based on the first subset of the holes that are at least partially clogged.

Aspects of the present disclosure result in technological advantages. The present disclosure avoids the time, inaccuracies, and subjectivity of conventional manual inspection. The present disclosure produces substrates that meet threshold values, avoids damage of equipment, increases throughput, avoids interruption of production, etc.

Although some embodiments of the present disclosure describe clog detection, the present disclosure can be applied to detection of partial clogs, worn components, foreign material, components that have a cleanliness that does not meet a threshold cleanliness, and/or the like.

FIG. 1 is a block diagram illustrating an exemplary system 100 (exemplary system architecture), according to certain embodiments. The system 100 includes a client device 120, manufacturing equipment 124, sensors 126, metrology equipment 128, a predictive server 112, and a data store 140. In some embodiments, the predictive server 112 is part of a predictive system 110. In some embodiments, the predictive system 110 further includes server machines 170 and 180.

In some embodiments, one or more of the client device 120, manufacturing equipment 124, sensors 126, metrology equipment 128, predictive server 112, data store 140, server machine 170, and/or server machine 180 are coupled to each other via a network 130 for generating predictive data 160 to perform clog detection. In some embodiments, network 130 is a public network that provides client device 120 with access to the predictive server 112, data store 140, and other publically available computing devices. In some embodiments, network 130 is a private network that provides client device 120 access to manufacturing equipment 124, sensors 126, metrology equipment 128, data store 140, and other privately available computing devices. In some embodiments, network 130 includes one or more Wide Area Networks (WANs), Local Area Networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

In some embodiments, the client device 120 includes a computing device such as Personal Computers (PCs), laptops, mobile phones, smart phones, tablet computers, netbook computers, etc. In some embodiments, the client device 120 includes a corrective action component 122. In some embodiments, the corrective action component 122 may also be included in the predictive system 110 (e.g., machine learning processing system). In some embodiments, the corrective action component 122 is alternatively included in the predictive system 110 (e.g., instead of being included in client device 120). Client device 120 includes an operating system that allows users to one or more of consolidate, generate, view, or edit data, provide directives to the predictive system 110 (e.g., machine learning processing system), etc.

In some embodiments, corrective action component 122 receives user input (e.g., via a Graphical User Interface (GUI) displayed via the client device 120), receives sensor data 142 from sensors, receives performance data 152 from metrology equipment 128, etc. In some embodiments, the corrective action component 122 transmits the data (e.g., user input, sensor data 142, performance data 152, etc.) to the predictive system 110, receives predictive data 160 from the predictive system 110, determines a corrective action based on the predictive data 160, and causes the corrective action to be implemented. In some embodiments, the corrective action component 122 stores data (e.g., user input, sensor data 142, performance data 152, etc.) in the data store 140 and the predictive server 112 retrieves data from the data store 140. In some embodiments, the predictive server 112 stores output (e.g., predictive data 160) of the trained machine learning model 190 in the data store 140 and the client device 120 retrieves the output from the data store 140. In some embodiments, the corrective action component 122 receives an indication of a corrective action (e.g., based on predictive data 160) from the predictive system 110 and causes performance of the corrective action.

In some embodiments, the predictive data 160 is associated with a corrective action. In some embodiments, a corrective action is associated with one or more of cleaning a substrate processing equipment part, repairing a substrate processing equipment part, replacing a substrate processing equipment part, Computational Process Control (CPC), Statistical Process Control (SPC) (e.g., SPC to compare to a graph of 3-sigma, etc.), Advanced Process Control (APC), model-based process control, preventative operative maintenance, design optimization, updating of manufacturing parameters, feedback control, machine learning modification, or the like. In some embodiments, the corrective action includes providing an alert (e.g., an alarm to not use the substrate processing equipment part or the manufacturing equipment 124 if the predictive data 160 indicates a predicted abnormality, such as an abnormality of the substrate processing equipment part or the product). In some embodiments, the corrective action includes providing feedback control (e.g., cleaning, repairing, and/or replacing the substrate processing equipment part responsive to the predictive data 160 indicating a predicted abnormality). In some embodiments, the corrective action includes providing machine learning (e.g., causing modification of a substrate processing equipment part based on the predictive data 160).

In some embodiments, the predictive server 112, server machine 170, and server machine 180 each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc.

The predictive server 112 includes a predictive component 114. In some embodiments, the predictive component 114 receives sensor data 142 (e.g., receive from the client device 120, retrieve from the data store 140) and generates predictive data 160 associated with clog detection. In some embodiments, the predictive component 114 uses one or more trained machine learning models 190 to determine the predictive data 160 for clog detection. In some embodiments, trained machine learning model 190 is trained using historical sensor data 144 and historical performance data 154.

In some embodiments, the predictive system 110 (e.g., predictive server 112, predictive component 114) generates predictive data 160 using supervised machine learning (e.g., supervised data set, historical sensor data 144 labeled with historical performance data 154, etc.). In some embodiments, the predictive system 110 generates predictive data 160 using semi-supervised learning (e.g., semi-supervised data set, performance data 152 is a predictive percentage, etc.). In some embodiments, the predictive system 110 generates predictive data 160 using unsupervised machine learning (e.g., unsupervised data set, clustering, clustering based on historical sensor data 144, etc.).

In some embodiments, the manufacturing equipment 124 (e.g., cluster tool) is part of a substrate processing system (e.g., integrated processing system). The manufacturing equipment 124 includes one or more of a controller, an enclosure system (e.g., substrate carrier, front opening unified pod (FOUP), autoteach FOUP, process kit enclosure system, substrate enclosure system, cassette, etc.), a side storage pod (SSP), an aligner device (e.g., aligner chamber), a factory interface (e.g., equipment front end module (EFEM)), a load lock, a transfer chamber, one or more processing chambers, a robot arm (e.g., disposed in the transfer chamber, disposed in the front interface, etc.), and/or the like. The enclosure system, SSP, and load lock mount to the factory interface and a robot arm disposed in the factory interface is to transfer content (e.g., substrates, process kit rings, carriers, validation wafer, etc.) between the enclosure system, SSP, load lock, and factory interface. The aligner device is disposed in the factory interface to align the content. The load lock and the processing chambers mount to the transfer chamber and a robot arm disposed in the transfer chamber is to transfer content (e.g., substrates, process kit rings, carriers, validation wafer, etc.) between the load lock, the processing chambers, and the transfer chamber. In some embodiments, the manufacturing equipment 124 includes components of substrate processing systems. In some embodiments, the sensor data 142 include parameters of processes performed by components of the manufacturing equipment 124 (e.g., etching, heating, cooling, transferring, processing, flowing, etc.). In some embodiments, substrate processing equipment parts are a component (e.g., showerhead, susceptor, etc.) of the processing chamber.

In some embodiments, the sensors 126 provide sensor data 142 (e.g., sensor values, such as historical sensor values and current sensor values) associated with manufacturing equipment 124. In some embodiments, the sensors 126 include one or more of an imaging sensor (e.g., camera, imaging device, etc.), a pressure sensor, a temperature sensor, a flow rate sensor, a spectroscopy sensor, and/or the like. In some embodiments, the sensor data 142 used for equipment health and/or product health (e.g., product quality). In some embodiments, the sensor data 142 are received over a period of time.

In some embodiments, sensors 126 provide sensor data 142 such as values of one or more of image data, leak rate, temperature, pressure, flow rate (e.g., gas flow), pumping efficiency, spacing (SP), High Frequency Radio Frequency (HFRF), electrical current, power, voltage, and/or the like.

In some embodiments, the sensor data 142 (e.g., historical sensor data 144, current sensor data 146, etc.) is processed (e.g., by the client device 120 and/or by the predictive server 112). In some embodiments, processing of the sensor data 142 includes generating features. In some embodiments, the features are a pattern in the sensor data 142 (e.g., slope, width, height, peak, etc.) or a combination of values from the sensor data 142 (e.g., power derived from voltage and current, etc.). In some embodiments, the sensor data 142 includes features that are used by the predictive component 114 for obtaining predictive data 160.

In some embodiments, the metrology equipment 128 (e.g., imaging equipment, spectroscopy equipment, ellipsometry equipment, etc.) is used to determine metrology data (e.g., inspection data, image data, spectroscopy data, ellipsometry data, material compositional, optical, or structural data, etc.) corresponding to substrates produced by the manufacturing equipment 124 (e.g., substrate processing equipment). In some examples, after the manufacturing equipment 124 processes substrates, the metrology equipment 128 is used to inspect portions (e.g., layers) of the substrates. In some embodiments, the metrology equipment 128 performs scanning acoustic microscopy (SAM), ultrasonic inspection, x-ray inspection, and/or computed tomography (CT) inspection. In some examples, after the manufacturing equipment 124 deposits one or more layers on a substrate, the metrology equipment 128 is used to determine quality of the processed substrate (e.g., thicknesses of the layers, uniformity of the layers, interlayer spacing of the layer, and/or the like). In some embodiments, the metrology equipment 128 includes an imaging device (e.g., SAM equipment, ultrasonic equipment, x-ray equipment, CT equipment, and/or the like). In some embodiments, performance data 152 includes metrology data from metrology equipment 128.

In some embodiments, the data store 140 is memory (e.g., random access memory), a drive (e.g., a hard drive, a flash drive), a database system, or another type of component or device capable of storing data. In some embodiments, data store 140 includes multiple storage components (e.g., multiple drives or multiple databases) that span multiple computing devices (e.g., multiple server computers). In some embodiments, the data store 140 stores one or more of sensor data 142, performance data 152, and/or predictive data 160.

Sensor data 142 includes historical sensor data 144 and current sensor data 146. In some embodiments, sensor data 142 may include one or more of image data, pressure data, pressure range, temperature data, temperature range, flow rate data, power data, comparison parameters for comparing inspection data with threshold data, threshold data, cooling rate data, cooling rate range, and/or the like. In some embodiments, at least a portion of the sensor data 142 is from sensors 126.

Performance data 152 includes historical performance data 154 and current performance data 156. Performance data 152 may include hole maps corresponding to a substrate processing equipment part (e.g., where holes are located or are predicted to be located on a substrate processing equipment part). In some examples, the performance data 152 is indicative of whether a substrate is properly designed, properly produced, and/or properly functioning. In some embodiments, at least a portion of the performance data 152 is associated with a quality of substrates produced by the manufacturing equipment 124. In some embodiments, at least a portion of the performance data 152 is based on metrology data from the metrology equipment 128 (e.g., historical performance data 154 includes metrology data indicating properly processed substrates, property data of substrates, yield, etc.). In some embodiments, at least a portion of the performance data 152 is based on inspection of the substrates (e.g., current performance data 156 based on actual inspection). In some embodiments, the performance data 152 includes an indication of an absolute value (e.g., inspection data of the bond interfaces indicates missing the threshold data by a calculated value, deformation value misses the threshold deformation value by a calculated value) or a relative value (e.g., inspection data of the bond interfaces indicates missing the threshold data by 5%, deformation misses threshold deformation by 5%). In some embodiments, the performance data 152 is indicative of meeting a threshold amount of error (e.g., at least 5% error in production, at least 5% error in flow, at least 5% error in deformation, specification limit).

In some embodiments, the client device 120 provides performance data 152 (e.g., product data). In some examples, the client device 120 provides (e.g., based on user input) performance data 152 that indicates an abnormality in products (e.g., defective products). In some embodiments, the performance data 152 includes an amount of products that have been produced that were normal or abnormal (e.g., 98% normal products). In some embodiments, the performance data 152 indicates an amount of products that are being produced that are predicted as normal or abnormal. In some embodiments, the performance data 152 includes one or more of yield a previous batch of products, average yield, predicted yield, predicted amount of defective or non-defective product, or the like. In some examples, responsive to yield on a first batch of products being 98% (e.g., 98% of the products were normal and 2% were abnormal), the client device 120 provides performance data 152 indicating that the upcoming batch of products is to have a yield of 98%.

In some embodiments, historical data includes one or more of historical sensor data 144 and/or historical performance data 154 (e.g., at least a portion for training the machine learning model 190). Current data includes one or more of current sensor data 146 and/or current performance data 156 (e.g., at least a portion to be input into the trained machine learning model 190 subsequent to training the model 190 using the historical data). In some embodiments, the current data is used for retraining the trained machine learning model 190.

In some embodiments, the predictive data 160 is to be used to cause performance of corrective actions on the substrate processing equipment parts.

Performing metrology on products to determine substrate processing equipment parts that do not meet a threshold quality incorrectly produced components (e.g., bonded metal plate structures) is costly in terms of time used, metrology equipment 128 used, energy consumed, bandwidth used to send the metrology data, processor overhead to process the metrology data, etc. By providing sensor data 142 to model 190 and receiving predictive data 160 from the model 190, system 100 has the technical advantage of avoiding the costly process of using metrology equipment 128 and discarding substrates.

Performing manufacturing processes with substrate processing equipment parts that result in defective products is costly in time, energy, products, substrate processing equipment parts, manufacturing equipment 124, the cost of identifying the substrate processing equipment part causing the defective products, cleaning the substrate processing equipment part, repairing the substrate processing equipment part, replacing the substrate processing equipment part, discarding the old component, etc. By providing sensor data 142 to model 190, receiving predictive data 160 from the model 190, and causing a corrective action based on the predictive data 160, system 100 has the technical advantage of avoiding the cost of producing, identifying, and discarding defective substrates.

In some embodiments, predictive system 110 further includes server machine 170 and server machine 180. Server machine 170 includes a data set generator 172 that is capable of generating data sets (e.g., a set of data inputs and a set of target outputs) to train, validate, and/or test a machine learning model(s) 190. The data set generator 172 has functions of data gathering, compilation, reduction, and/or partitioning to put the data in a form for machine learning. In some embodiments (e.g., for small datasets), partitioning (e.g., explicit partitioning) for post-training validation is not used. Repeated cross-validation (e.g., 5-fold cross-validation, leave-one-out-cross-validation) may be used during training where a given dataset is in-effect repeatedly partitioned into different training and validation sets during training. A model (e.g., the best model, the model with the highest accuracy, etc.) is chosen from vectors of models over automatically-separated combinatoric subsets. In some embodiments, the data set generator 172 may explicitly partition the historical data (e.g., historical sensor data 144 and corresponding historical performance data 154) into a training set (e.g., sixty percent of the historical data), a validating set (e.g., twenty percent of the historical data), and a testing set (e.g., twenty percent of the historical data). In this embodiment, some operations of data set generator 172 are described in detail below with respect to FIGS. 2 and 5A. In some embodiments, the predictive system 110 (e.g., via predictive component 114) generates multiple sets of features (e.g., training features). In some examples a first set of features corresponds to a first set of types of sensor data (e.g., from a first set of sensors, first combination of values from first set of sensors, first patterns in the values from the first set of sensors) that correspond to each of the data sets (e.g., training set, validation set, and testing set) and a second set of features correspond to a second set of types of sensor data (e.g., from a second set of sensors different from the first set of sensors, second combination of values different from the first combination, second patterns different from the first patterns) that correspond to each of the data sets.

Server machine 180 includes a training engine 182, a validation engine 184, selection engine 185, and/or a testing engine 186. In some embodiments, an engine (e.g., training engine 182, a validation engine 184, selection engine 185, and a testing engine 186) refers to hardware (e.g., circuitry, dedicated logic, programmable logic, microcode, processing device, etc.), software (such as instructions run on a processing device, a general purpose computer system, or a dedicated machine), firmware, microcode, or a combination thereof. The training engine 182 is capable of training a machine learning model 190 using one or more sets of features associated with the training set from data set generator 172. In some embodiments, the training engine 182 generates multiple trained machine learning models 190, where each trained machine learning model 190 corresponds to a distinct set of parameters of the training set (e.g., sensor data 142) and corresponding responses (e.g., performance data 152). In some embodiments, multiple models are trained on the same parameters with distinct targets for the purpose of modeling multiple effects. In some examples, a first trained machine learning model was trained using sensor data 142 from all sensors 126 (e.g., sensors 1-5), a second trained machine learning model was trained using a first subset of the sensor data (e.g., from sensors 1, 2, and 4), and a third trained machine learning model was trained using a second subset of the sensor data (e.g., from sensors 1, 3, 4, and 5) that partially overlaps the first subset of features.

The validation engine 184 is capable of validating a trained machine learning model 190 using a corresponding set of features of the validation set from data set generator 172. For example, a first trained machine learning model 190 that was trained using a first set of features of the training set is validated using the first set of features of the validation set. The validation engine 184 determines an accuracy of each of the trained machine learning models 190 based on the corresponding sets of features of the validation set. The validation engine 184 evaluates and flags (e.g., to be discarded) trained machine learning models 190 that have an accuracy that does not meet a threshold accuracy. In some embodiments, the selection engine 185 is capable of selecting one or more trained machine learning models 190 that have an accuracy that meets a threshold accuracy. In some embodiments, the selection engine 185 is capable of selecting the trained machine learning model 190 that has the highest accuracy of the trained machine learning models 190.

The testing engine 186 is capable of testing a trained machine learning model 190 using a corresponding set of features of a testing set from data set generator 172. For example, a first trained machine learning model 190 that was trained using a first set of features of the training set is tested using the first set of features of the testing set. The testing engine 186 determines a trained machine learning model 190 that has the highest accuracy of all of the trained machine learning models based on the testing sets.

In some embodiments, the machine learning model 190 (e.g., used for classification) refers to the model artifact that is created by the training engine 182 using a training set that includes data inputs and corresponding target outputs (e.g. correctly classifies a condition or ordinal level for respective training inputs). Patterns in the data sets can be found that map the data input to the target output (the correct classification or level), and the machine learning model 190 is provided mappings that captures these patterns. In some embodiments, the machine learning model 190 uses one or more of Gaussian Process Regression (GPR), Gaussian Process Classification (GPC), Bayesian Neural Networks, Neural Network Gaussian Processes, Deep Belief Network, Gaussian Mixture Model, or other Probabilistic Learning methods. Non probabilistic methods may also be used including one or more of Support Vector Machine (SVM), Radial Basis Function (RBF), clustering, Nearest Neighbor algorithm (k-NN), linear regression, random forest, neural network (e.g., artificial neural network), etc. In some embodiments, the machine learning model 190 is a multi-variate analysis (MVA) regression model.

Predictive component 114 provides current sensor data 146 (e.g., as input) to the trained machine learning model 190 and runs the trained machine learning model 190 (e.g., on the input to obtain one or more outputs). The predictive component 114 is capable of determining (e.g., extracting) predictive data 160 from the trained machine learning model 190 and determines (e.g., extracts) uncertainty data that indicates a level of credibility that the predictive data 160 corresponds to current performance data 156. In some embodiments, the predictive component 114 or corrective action component 122 use the uncertainty data (e.g., uncertainty function or acquisition function derived from uncertainty function) to decide whether to use the predictive data 160 to perform a corrective action or whether to further train the model 190.

Figure 2:
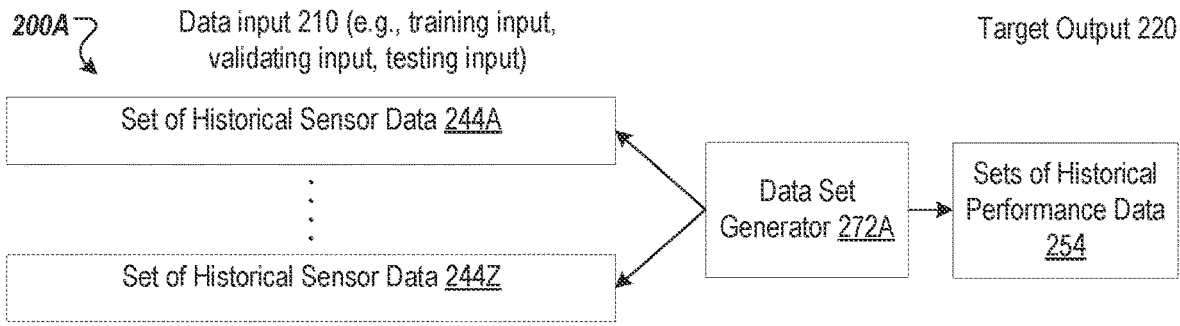
FIG. 2 illustrates a data set generator to create data sets for a machine learning model, according to certain embodiments.

For purpose of illustration, rather than limitation, aspects of the disclosure describe the training of one or more machine learning models 190 using historical data (i.e., prior data, historical sensor data 144 and historical performance data 154) and providing current sensor data 146 into the one or more trained probabilistic machine learning models 190 to determine predictive data 160. In other implementations, a heuristic model or rule-based model is used to determine predictive data 160 (e.g., without using a trained machine learning model). In other implementations non-probabilistic machine learning models may be used. Predictive component 114 monitors historical sensor data 144 and historical performance data 154. In some embodiments, any of the information described with respect to data inputs 210 of FIG. 2 are monitored or otherwise used in the heuristic or rule-based model.

In some embodiments, the functions of client device 120, predictive server 112, server machine 170, and server machine 180 are be provided by a fewer number of machines. For example, in some embodiments, server machines 170 and 180 are integrated into a single machine, while in some other embodiments, server machine 170, server machine 180, and predictive server 112 are integrated into a single machine. In some embodiments, client device 120 and predictive server 112 are integrated into a single machine.

In general, functions described in one embodiment as being performed by client device 120, predictive server 112, server machine 170, and server machine 180 can also be performed on predictive server 112 in other embodiments, if appropriate. In addition, the functionality attributed to a particular component can be performed by different or multiple components operating together. For example, in some embodiments, the predictive server 112 determines corrective actions based on the predictive data 160. In another example, client device 120 determines the predictive data 160 based on data received from the trained machine learning model.

In addition, the functions of a particular component can be performed by different or multiple components operating together. In some embodiments, one or more of the predictive server 112, server machine 170, or server machine 180 are accessed as a service provided to other systems or devices through appropriate application programming interfaces (API).

In some embodiments, a "user" is represented as a single individual. However, other embodiments of the disclosure encompass a "user" being an entity controlled by a plurality of users and/or an automated source. In some examples, a set of individual users federated as a group of administrators is considered a "user."

Although embodiments of the disclosure are discussed in terms of determining predictive data 160 for clog detection of substrate processing equipment parts in manufacturing facilities (e.g., substrate processing facilities), in some embodiments, the disclosure can also be generally applied to quality detection. Embodiments can be generally applied to determining quality of parts based on different types of data.

FIG. 2 illustrates a data set generator 272 (e.g., data set generator 172 of FIG. 1) to create data sets for a machine learning model (e.g., model 190 of FIG. 1), according to certain embodiments. In some embodiments, data set generator 272 is part of server machine 170 of FIG. 1. The data sets generated by data set generator 272 of FIG. 2 may be used to train a machine learning model (e.g., see FIG. 5C) to cause performance of a corrective action (e.g., see FIG. 5D).

Data set generator 272 (e.g., data set generator 172 of FIG. 1) creates data sets for a machine learning model (e.g., model 190 of FIG. 1). Data set generator 272 creates data sets using historical sensor data 244 (e.g., historical sensor data 144 of FIG. 1) and historical performance data 254 (e.g., historical performance data 154 of FIG. 1). System 200 of FIG. 2 illustrates data set generator 272, data inputs 210, and target output 220 (e.g., target data).

In some embodiments, data set generator 272 generates a data set (e.g., training set, validating set, testing set) that includes one or more data inputs 210 (e.g., training input, validating input, testing input) and one or more target outputs 220 that correspond to the data inputs 210. The data set also includes mapping data that maps the data inputs 210 to the target outputs 220. Data inputs 210 are also referred to as "features," "attributes," or information." In some embodiments, data set generator 272 provides the data set to the training engine 182, validating engine 184, or testing engine 186, where the data set is used to train, validate, or test the machine learning model 190. Some embodiments of generating a training set are further described with respect to FIG. 5A.

In some embodiments, data set generator 272 generates the data input 210 and target output 220. In some embodiments, data inputs 210 include one or more sets of historical sensor data 244. In some embodiments, historical sensor data 244 includes one or more of sensor data from one or more types of sensors, combination of sensor data from one or more types of sensors, patterns from sensor data from one or more types of sensors, and/or the like.

In some embodiments, data set generator 272 generates a first data input corresponding to a first set of historical sensor data 244A to train, validate, or test a first machine learning model and the data set generator 272 generates a second data input corresponding to a second set of historical sensor data 244B to train, validate, or test a second machine learning model.

In some embodiments, the data set generator 272 discretizes (e.g., segments) one or more of the data input 210 or the target output 220 (e.g., to use in classification algorithms for regression problems). Discretization (e.g., segmentation via a sliding window) of the data input 210 or target output 220 transforms continuous values of variables into discrete values. In some embodiments, the discrete values for the data input 210 indicate discrete historical sensor data 244 to obtain a target output 220 (e.g., discrete historical performance data 254).

Data inputs 210 and target outputs 220 to train, validate, or test a machine learning model include information for a particular facility (e.g., for a particular substrate manufacturing facility). In some examples, historical sensor data 244 and historical performance data 254 are for the same manufacturing facility.

In some embodiments, the information used to train the machine learning model is from specific types of manufacturing equipment 124 of the manufacturing facility having specific characteristics and allow the trained machine learning model to determine outcomes for a specific group of manufacturing equipment 124 based on input for current parameters (e.g., current sensor data 146) associated with one or more components sharing characteristics of the specific group. In some embodiments, the information used to train the machine learning model is for components from two or more manufacturing facilities and allows the trained machine learning model to determine outcomes for components based on input from one manufacturing facility.

In some embodiments, subsequent to generating a data set and training, validating, or testing a machine learning model 190 using the data set, the machine learning model 190 is further trained, validated, or tested (e.g., current performance data 156 of FIG. 1) or adjusted (e.g., adjusting weights associated with input data of the machine learning model 190, such as connection weights in a neural network).

Figure 3:
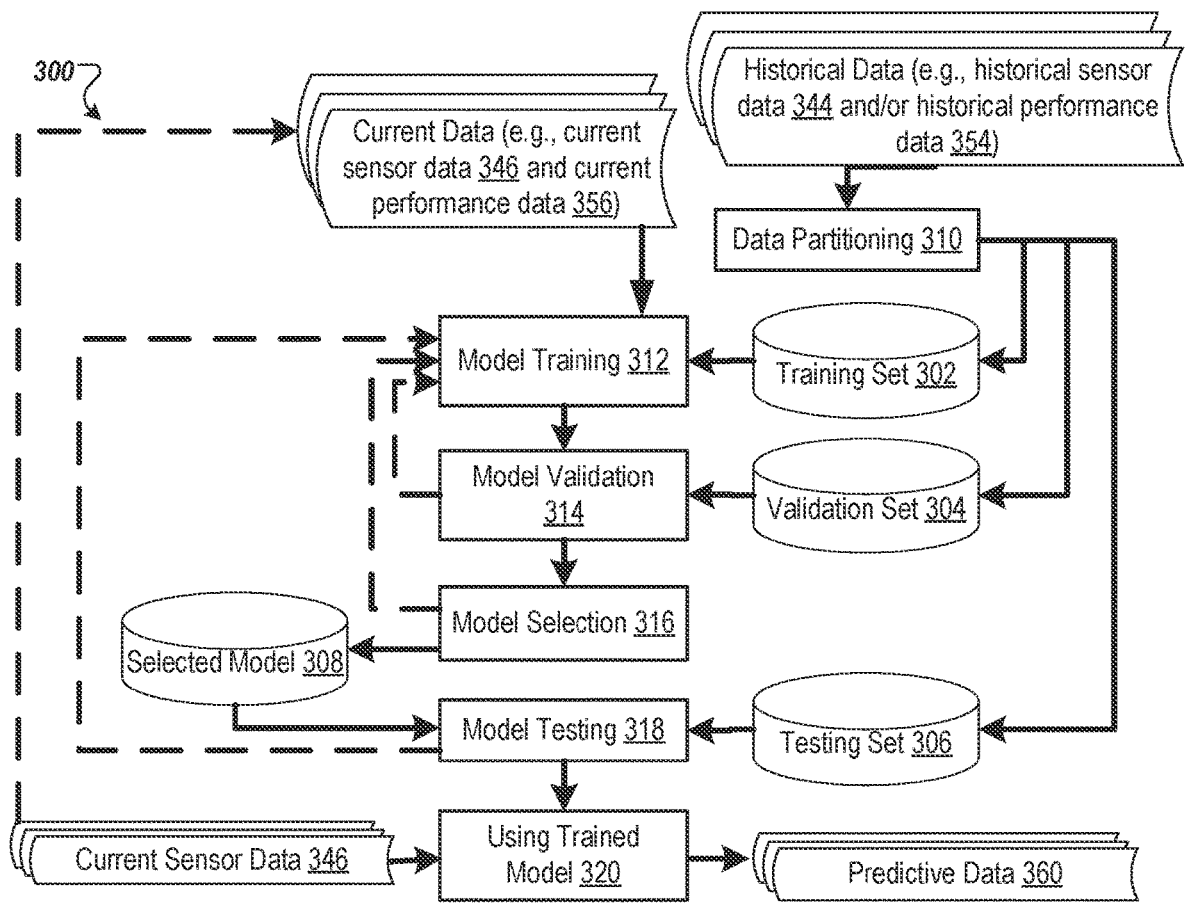
FIG. 3 is a block diagram illustrating determining predictive data, according to certain embodiments.

FIG. 3 is a block diagram illustrating a system 300 for generating predictive data 360 (e.g., predictive data 160 of FIG. 1), according to certain embodiments. The system 300 is used to determine predictive data 360 via a trained machine learning model (e.g., model 190 of FIG. 1) for clog detection (e.g., for performance of a corrective action).

At block 310, the system 300 (e.g., predictive system 110 of FIG. 1) performs data partitioning (e.g., via data set generator 172 of server machine 170 of FIG. 1) of the historical data (e.g., historical sensor data 344 and historical performance data 354 for model 190 of FIG. 1) to generate the training set 302, validation set 304, and testing set 306. In some examples, the training set is 60% of the historical data, the validation set is 20% of the historical data, and the testing set is 20% of the historical data. The system 300 generates a plurality of sets of features for each of the training set, the validation set, and the testing set. In some examples, if the historical data includes features derived from 20 sensors (e.g., sensors 126 of FIG. 1) and 100 products (e.g., products that each correspond to sensor data from the 20 sensors), a first set of features is sensors 1-10, a second set of features is sensors 11-20, the training set is products 1-60, the validation set is products 61-80, and the testing set is products 81-100. In this example, the first set of features of the training set would be parameters from sensors 1-10 for products 1-60.

At block 312, the system 300 performs model training (e.g., via training engine 182 of FIG. 1) using the training set 302. In some embodiments, the system 300 trains multiple models using multiple sets of features of the training set 302 (e.g., a first set of features of the training set 302, a second set of features of the training set 302, etc.). For example, system 300 trains a machine learning model to generate a first trained machine learning model using the first set of features in the training set (e.g., sensor data from sensors 1-10 for products 1-60) and to generate a second trained machine learning model using the second set of features in the training set (e.g., sensor data from sensors 11-20 for products 1-60). In some embodiments, the first trained machine learning model and the second trained machine learning model are combined to generate a third trained machine learning model (e.g., which is a better predictor than the first or the second trained machine learning model on its own in some embodiments). In some embodiments, sets of features used in comparing models overlap (e.g., first set of features being sensor data from sensors 1-15 and second set of features being sensor data from sensors 5-20). In some embodiments, hundreds of models are generated including models with various permutations of features and combinations of models.

At block 314, the system 300 performs model validation (e.g., via validation engine 184 of FIG. 1) using the validation set 304. The system 300 validates each of the trained models using a corresponding set of features of the validation set 304. For example, system 300 validates the first trained machine learning model using the first set of features in the validation set (e.g., parameters from sensors 1-10 for products 61-80) and the second trained machine learning model using the second set of features in the validation set (e.g., parameters from sensors 11-20 for products 61-80). In some embodiments, the system 300 validates hundreds of models (e.g., models with various permutations of features, combinations of models, etc.) generated at block 312. At block 314, the system 300 determines an accuracy of each of the one or more trained models (e.g., via model validation) and determines whether one or more of the trained models has an accuracy that meets a threshold accuracy. Responsive to determining that none of the trained models has an accuracy that meets a threshold accuracy, flow returns to block 312 where the system 300 performs model training using different sets of features of the training set. Responsive to determining that one or more of the trained models has an accuracy that meets a threshold accuracy, flow continues to block 316. The system 300 discards the trained machine learning models that have an accuracy that is below the threshold accuracy (e.g., based on the validation set).

At block 316, the system 300 performs model selection (e.g., via selection engine 185 of FIG. 1) to determine which of the one or more trained models that meet the threshold accuracy has the highest accuracy (e.g., the selected model 308, based on the validating of block 314). Responsive to determining that two or more of the trained models that meet the threshold accuracy have the same accuracy, flow returns to block 312 where the system 300 performs model training using further refined training sets corresponding to further refined sets of features for determining a trained model that has the highest accuracy.

At block 318, the system 300 performs model testing (e.g., via testing engine 186 of FIG. 1) using the testing set 306 to test the selected model 308. The system 300 tests, using the first set of features in the testing set (e.g., sensor data from sensors 1-10 for products 81-100), the first trained machine learning model to determine the first trained machine learning model meets a threshold accuracy (e.g., based on the first set of features of the testing set 306). Responsive to accuracy of the selected model 308 not meeting the threshold accuracy (e.g., the selected model 308 is overly fit to the training set 302 and/or validation set 304 and is not applicable to other data sets such as the testing set 306), flow continues to block 312 where the system 300 performs model training (e.g., retraining) using different training sets corresponding to different sets of features (e.g., sensor data from different sensors). Responsive to determining that the selected model 308 has an accuracy that meets a threshold accuracy based on the testing set 306, flow continues to block 320. In at least block 312, the model learns patterns in the historical data to make predictions and in block 318, the system 300 applies the model on the remaining data (e.g., testing set 306) to test the predictions.

At block 320, system 300 uses the trained model (e.g., selected model 308) to receive current sensor data 346 (e.g., current sensor data 146 of FIG. 1) and determines (e.g., extracts), from the trained model, predictive data 360 (e.g., predictive data 160 of FIG. 1) for clog detection to perform a corrective action. In some embodiments, the current sensor data 346 corresponds to the same types of features in the historical sensor data 344. In some embodiments, the current sensor data 346 corresponds to a same type of features as a subset of the types of features in historical sensor data 344 that is used to train the selected model 308.

In some embodiments, current data is received. In some embodiments, current data includes current performance data 356 (e.g., current performance data 156 of FIG. 1) and/or current sensor data 346. In some embodiments, at least a portion of the current data is received from metrology equipment (e.g., metrology equipment 128 of FIG. 1) or via user input. In some embodiments, the model 308 is retrained based on the current data. In some embodiments, a new model is trained based on the current performance data 356 and the current sensor data 346.

In some embodiments, one or more of the blocks 310-320 occur in various orders and/or with other operations not presented and described herein. In some embodiments, one or more of blocks 310-320 are not performed. For example, in some embodiments, one or more of data partitioning of block 310, model validation of block 314, model selection of block 316, and/or model testing of block 318 are not performed.

FIG. 4A illustrates an image capturing device 400 (e.g., configured to provide backlight images of substrate processing equipment parts), according to certain embodiments.

Image capturing device may include a housing 410 that includes walls (e.g., sidewalls, upper wall, bottom wall) that at least partially enclose an interior volume. The housing (e.g., upper wall) may form an opening 412. A light emitting device 414 may be disposed in the interior volume of the housing 410. A spacer 416 may be disposed on or integral to the light emitting device 414. A substrate processing equipment part 420 that forms holes 422 may be disposed on the spacer 416.

The substrate processing equipment part 420 may be a showerhead, a susceptor, etc. In some embodiments, the substrate processing equipment part 420 is cylindrical (e.g., circular perimeter). In some embodiments, the holes 422 are perpendicular (e.g., 90 degrees) to the upper surface and/or the lower surface of the substrate processing equipment part 420. In some embodiments, the holes 422 are substantially perpendicular (e.g., 90-95 degrees, 90-100 degrees, 95-100 degrees, etc.) to the upper surface and/or the lower surface of the substrate processing equipment part 420. In some embodiments, the holes 422 are not be perpendicular (e.g., 91-120 degrees, 91-135 degrees, 91-179 degrees, etc.) to the upper surface and/or lower surface of the substrate processing equipment part 420. In some embodiments, the holes 422 are a straight channel from the upper surface to the lower surface of the substrate processing equipment part 420. In some embodiments, the holes 422 allow light to project through the substrate processing equipment part 420.

A sensor 418 (e.g., imaging device, camera, etc.) may be disposed on the housing 410 above the opening 412. The sensor 418 may capture sensor data (e.g., image data, images, videos) of the substrate processing equipment part 420 while the light emitting device 414 is emitting light. The sensor data may include images of light passing through one or more of the holes 422 (e.g., through at least partially unblocked holes). A component (e.g., diffuser sheet) may be disposed between sensor 418 and the substrate processing equipment part 420.

The image capturing device 400 may be a dark room fixture (e.g., housing 410 that does not allow outside light to enter once closed) installed with a pre-fitted camera (e.g., sensor 418). The sensor 418 may capture high resolution digital images by passing a constraint light (e.g., from light emitting device 414) through a diffusor sheet.

FIGS. 4B-C illustrate processing of an image of a substrate processing equipment part 420, according to certain embodiments. In some embodiments, a substrate processing equipment part 420 forms holes 422 arranged in spirals, such as those shown in FIGS. 4B-C. In some embodiments, a substrate processing equipment part 420 forms holes 422 arranged in one or more other patterns (e.g., non-spiral patterns).

A processing device may receive an image 430A (e.g., an original input image, sensor data from sensor 418). For example, a processing device may read an input image in an image processing algorithm. The processing device may process the image 430A of FIG. 4B to generate processed image 430B of FIG. 4C. The processing device may mask a relevant area (e.g., the area of the holes 422) from the image 430A to enhance the showerhead holes and limit (e.g., eliminate) background errors in processed image 430B. The processing device may resize the image 430A to a predetermined size to remove scale factors to generate processed image 430B. Processed image 430B may highlight features of interest (e.g., light passing through holes 422).

Referring to FIG. 4D, the processing device may further perform contour detection (e.g., apply a contour detection algorithm) to detect the projection of each illuminated hole (e.g., of holes 422) and localize the image foreground to generate processed image 430C from processed image 430B or from image 430A.

To find the different features of the contours, the processing device may calculate the centroid and area of each contour. To locate each hole 422 of the substrate processing equipment part 420 (e.g., showerhead), the processing device may derive the associated x- and y-coordinates. The processing device may calculate the centroid of the substrate processing equipment part 420 (e.g., showerhead) based on the centroid distribution of identified holes 422.

FIG. 4E illustrates an enlarged view of processed image 430C that illustrates individual hole 422 contour detection through transformation.

FIG. 4F illustrates an enlarged view of processed image 430C that illustrates radial distance (r) and angular distance (theta) of a hole 422 and neighbors (e.g., the four neighbors) of a hole 422. The processing device may determine the centroid of the complete substrate processing equipment part (e.g., showerhead) as a reference and may convert the Cartesian coordinates system into polar coordinates (radius (r), angle (theta)). The processing device may apply radial magnification on the radial distance of each hole 422 to separate the clockwise and anti-clockwise spirals (e.g., the Fermat's pattern) distinctly. The processing device may determine the nearest neighbors (e.g., determine the four nearest neighbors). The processing device may determine the nearest neighbors by using a k-dimension tree (KDTree) (e.g., a space partitioning data structure for organizing points in k-dimensional space, binary space partitioning trees) or cKDTree (e.g., KDTree implemented in C++ and/or wrapped in Cython). The processing device may calculate radial and angular distance for each point with the recognized neighbors. The processing device may use nearest neighbor distance to connect and associate each hole 422 to a residing spiral (e.g., clockwise or anti-clockwise) of the hole 422. The processing device may tag a sequence of holes as identifying coordinate (e.g., R1-1, R1-2, R2-849, R2-848, where R1 is a first spiral and R2 is a second spiral).

FIG. 4G illustrates a graph 440 from center of all connected nearest neighbor holes falls into a similar curve forming clockwise spiral 442 and anti-clockwise spiral 444 configuration of the holes 422. The x-axis is the radial angle (e.g., theta) and the y-axis is the radius.

FIG. 4H illustrates a graph 450 of the holes 422 of a substrate processing equipment part 420. The x-axis is the distance from center in the y-direction and the y-axis is the distance from the center in the x-direction. Graph 450 illustrates the x-distance from the center and the y-distance from the center of each hole 422.

In some embodiments, for each hole 422, the processing logic compares the neighboring angular distance with the median distance in that spiral to identify fully clogged (e.g., missing) holes or active (e.g., present) holes. The processing logic may apply a threshold value to the area of each hole to identify partially clogged holes and generate a clogged status report. Based on the clogged status results, the processing logic may cause additional cleaning cycles, longer cleaning cycle times, maintenance, repair, replacement, etc. The area and status of each hole 422 with cleaning time may indicate the effectiveness of cleaning.

In some embodiments, processing logic may receive flow data (e.g., associated with flowing fluid through the substrate processing equipment part 420) to determine whether the substrate processing equipment part 420 meets threshold values (e.g., was cleaned properly).

FIGS. 5A-D are flow diagrams of methods 500A-D associated with clog detection via image analytics, according to certain embodiments. In some embodiments, methods 500A-D are performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, methods 500A-D are performed, at least in part, by predictive system 110. In some embodiments, method 500A is performed, at least in part, by predictive system 110 (e.g., server machine 170 and data set generator 172 of FIG. 1, data set generator 272 of FIG. 2). In some embodiments, predictive system 110 uses method 500A to generate a data set to at least one of train, validate, or test a machine learning model. In some embodiments, method 500B is performed by client device 120 or predictive system 110 (e.g., corrective action component 122). In some embodiments, method 500C is performed by server machine 180 (e.g., training engine 182, etc.). In some embodiments, method 500D is performed by predictive server 112 (e.g., predictive component 114). In some embodiments, method 500D is performed by client device 120 (e.g., corrective action component 122). In some embodiments, a non-transitory storage medium stores instructions that when executed by a processing device (e.g., of predictive system 110, of server machine 180, of predictive server 112, of client device 120, etc.), cause the processing device to perform one or more of methods 500A-D.

For simplicity of explanation, methods 500A-D are depicted and described as a series of operations. However, operations in accordance with this disclosure can occur in various orders and/or concurrently and with other operations not presented and described herein. Furthermore, in some embodiments, not all illustrated operations are performed to implement methods 500A-D in accordance with the disclosed subject matter. In addition, those skilled in the art will understand and appreciate that methods 500A-D could alternatively be represented as a series of interrelated states via a state diagram or events.

Figure 5A:
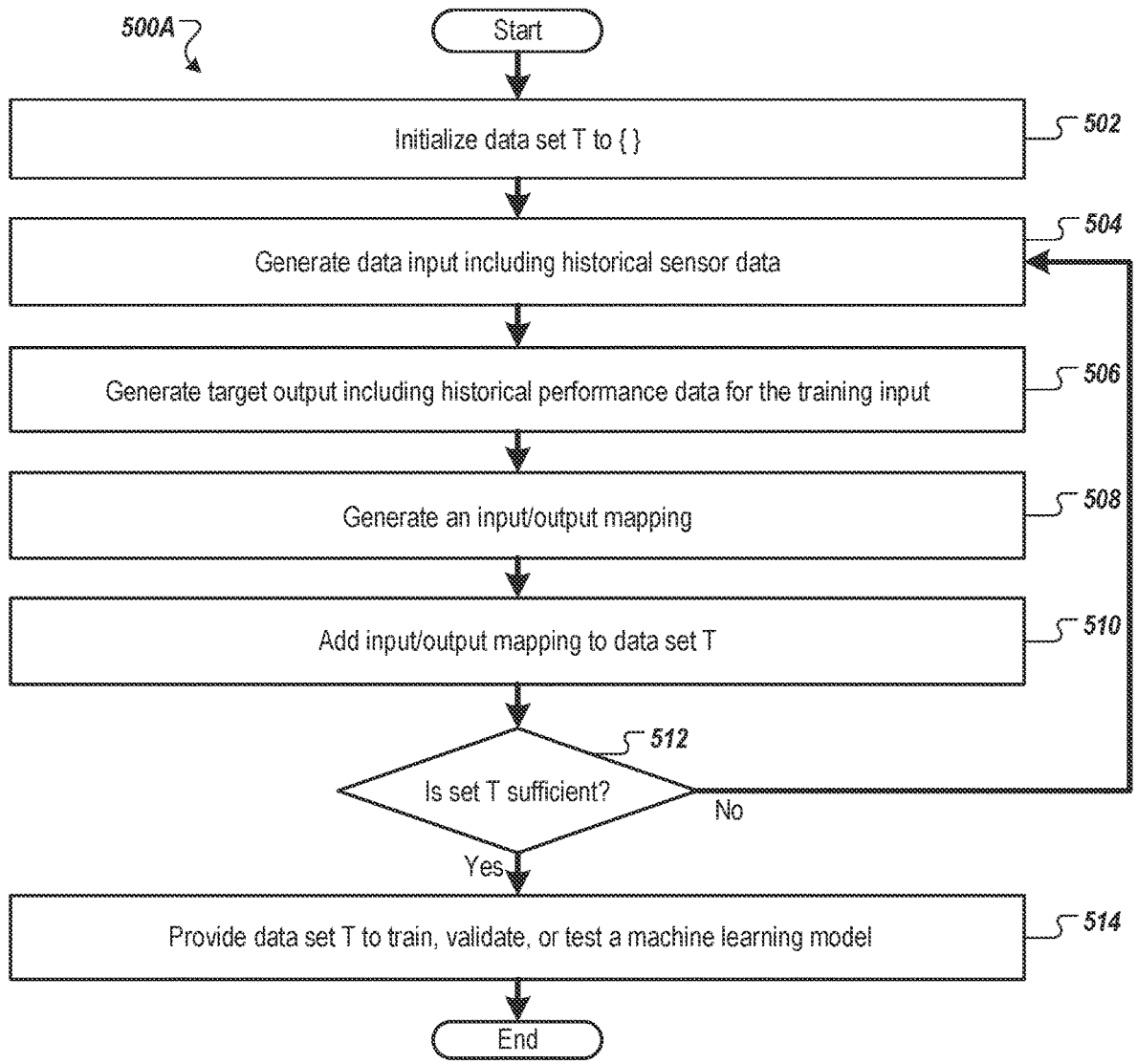
FIGS. 5A-D are flow diagrams of methods associated with clog detection via image analytics, according to certain embodiments.

FIG. 5A is a flow diagram of a method 500A for generating a data set for a machine learning model for generating predictive data (e.g., predictive data 160 of FIG. 1), according to certain embodiments.

Referring to FIG. 5A, in some embodiments, at block 502 the processing logic implementing method 500A initializes a training set T to an empty set.

At block 504, processing logic generates first data input (e.g., first training input, first validating input) that includes sensor data (e.g., historical sensor data 144 of FIG. 1, historical sensor data 244 of FIG. 2, etc.). In some embodiments, the first data input includes a first set of features for types of sensor data and a second data input includes a second set of features for types of sensor data (e.g., as described with respect to FIG. 2).

At block 506, processing logic generates a first target output for one or more of the data inputs (e.g., first data input). In some embodiments, the first target output is historical performance data (e.g., historical performance data 154 of FIG. 1, historical performance data 254 of FIG. 2).

At block 508, processing logic optionally generates mapping data that is indicative of an input/output mapping. The input/output mapping (or mapping data) refers to the data input (e.g., one or more of the data inputs described herein), the target output for the data input (e.g., where the target output identifies historical performance data 154), and an association between the data input(s) and the target output.

At block 510, processing logic adds the mapping data generated at block 508 to data set T.

At block 512, processing logic branches based on whether data set T is sufficient for at least one of training, validating, and/or testing machine learning model 190 (e.g., uncertainty of the trained machine learning model meets a threshold uncertainty). If so, execution proceeds to block 514, otherwise, execution continues back to block 504. It should be noted that in some embodiments, the sufficiency of data set T is determined based simply on the number of input/output mappings in the data set, while in some other implementations, the sufficiency of data set T is determined based on one or more other criteria (e.g., a measure of diversity of the data examples, accuracy, etc.) in addition to, or instead of, the number of input/output mappings.

At block 514, processing logic provides data set T (e.g., to server machine 180) to train, validate, and/or test machine learning model 190. In some embodiments, data set T is a training set and is provided to training engine 182 of server machine 180 to perform the training. In some embodiments, data set T is a validation set and is provided to validation engine 184 of server machine 180 to perform the validating. In some embodiments, data set T is a testing set and is provided to testing engine 186 of server machine 180 to perform the testing. In the case of a neural network, for example, input values of a given input/output mapping (e.g., numerical values associated with data inputs 210) are input to the neural network, and output values (e.g., numerical values associated with target outputs 220) of the input/output mapping are stored in the output nodes of the neural network. The connection weights in the neural network are then adjusted in accordance with a learning algorithm (e.g., back propagation, etc.), and the procedure is repeated for the other input/output mappings in data set T.

After block 514, machine learning model (e.g., machine learning model 190) can be at least one of trained using training engine 182 of server machine 180, validated using validating engine 184 of server machine 180, or tested using testing engine 186 of server machine 180. The trained machine learning model is implemented by predictive component 114 (of predictive server 112) to generate predictive data (e.g., predictive data 160) for clog detection to cause performance of a corrective action.

Figure 5B:
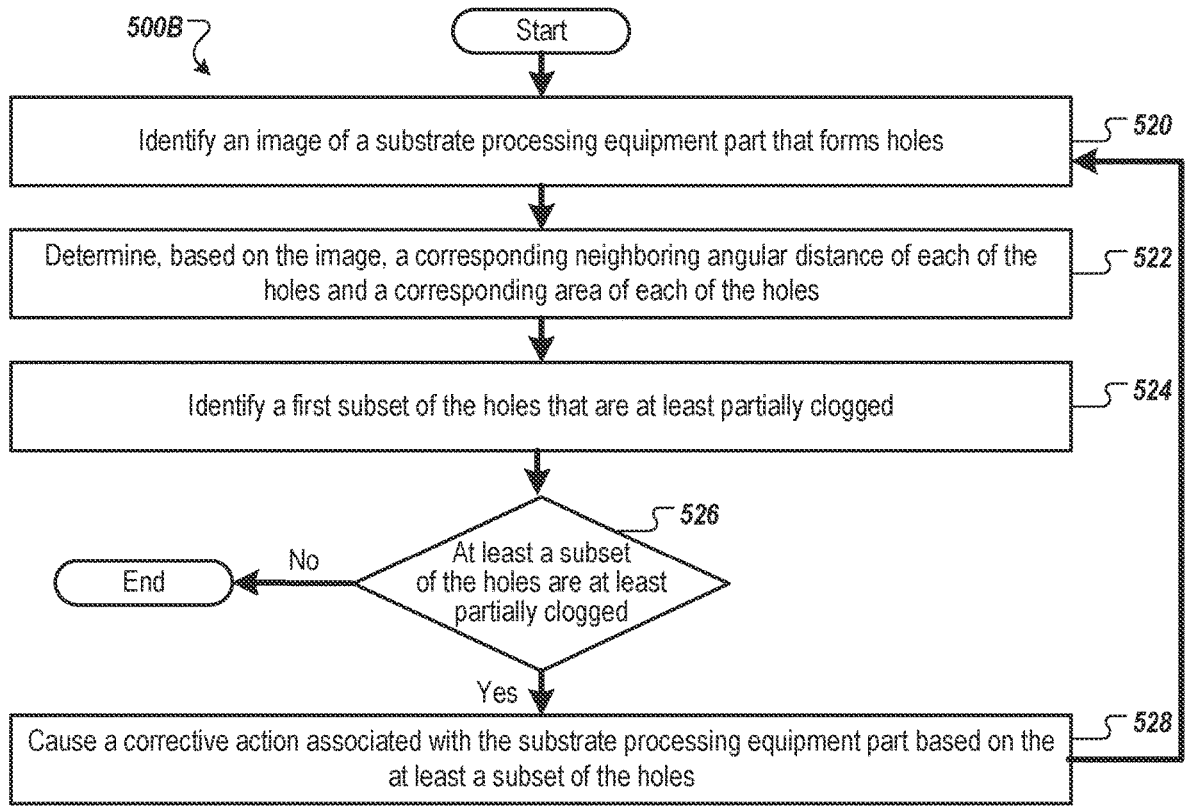

FIG. 5B is a method 500B associated with clog detection via image analytics, according to certain embodiments. In some embodiments, method 500B is performed before and after cleaning of a substrate processing equipment part.

At block 520 of method 500B, the processing logic identifies an image (e.g., backlight image) of a substrate processing equipment part that forms holes. The substrate processing equipment part (e.g., substrate processing equipment part 420 of FIG. 4A) may be a showerhead, a susceptor, etc.

In some embodiments, the processing logic receives the image from an image capturing device (e.g., image capturing device 400 of FIG. 4A). The image capturing device may provide light through the substrate processing equipment part. Light that has passed through unclogged holes may be illustrated in the image. Each unclogged hole may be associated with a shape of light that has a corresponding area. A partially clogged hole is associated with an area that is smaller than an area of a hole that is less clogged (e.g., a non-clogged hole).

In some embodiments, the image is captured of a first surface of the substrate processing equipment part while providing light towards a second surface of the substrate processing equipment part that is opposite (e.g., and substantially parallel to) the first surface. The light passes through at least a subset of the holes of the substrate processing equipment part.

In some embodiments, the processing logic masks an area from the image to enhance visibility of the holes formed by the substrate processing equipment part and to reduce background errors. In some embodiments, the processing logic resizes the image to a predetermined size to remove scale factors.

In some embodiments, the processing logic applies a threshold pixel values to the image. In some embodiments, the pixel format of the image is a byte image where a pixel value is a number stored as an 8-bit integer giving a range of possible values from 0 to 255, where 0 is black and 255 is white. The processing logic may convert all pixel values above a threshold pixel value (e.g., 200) to white (e.g., pixel value of 255) and may convert all pixel values below a threshold pixel value (e.g., 200) to be black (e.g., a pixel value of 0). This may remove gray pixel values from the image.

In some embodiments, the processing logic performs contour detection to detect a projection of each of the holes and to localize an image foreground. The processing logic may determine a corresponding centroid and the corresponding area of each of the holes. The processing logic may determine corresponding Cartesian coordinates of each of the holes. The processing logic may determine a part centroid of the substrate processing equipment part based on the corresponding centroid of each of the holes. The processing logic may convert, based on the part centroid, the corresponding Cartesian coordinates of each of the holes into corresponding polar coordinates. The processing logic may apply radial magnification of a corresponding radial distance of the corresponding polar coordinates of each of the holes to separate a clockwise holes spiral and an anti-clockwise holes spiral.

At block 522, the processing logic determines based on the image, a corresponding neighboring angular distance of each of the holes and a corresponding area of each of the holes.

At block 524, the processing logic identifies a first subset of the holes that are at least partially clogged (e.g., based on at least one of the corresponding neighboring angular distance or the corresponding area of each of the holes).

In some embodiments, to identify the first subset of the holes, the processing logic identifies corresponding hole neighbors and corresponding polar coordinates of each of the holes, associates each of the holes with a corresponding holes spiral using a corresponding nearest neighbor distance, and compares the corresponding neighboring angular distance of each of the holes with a threshold neighboring angular distance to identify clogged holes (e.g., if distance between particular neighboring holes is greater than a median distance between neighboring holes, then a hole may be clogged between the particular neighboring holes).

In some embodiments, to identify the first subset of the holes, the processing logic compares the corresponding area of each of the plurality of holes with a threshold area (e.g., 50%, 60%, 70%, etc.) to identify partially clogged holes.

Figure 5C:
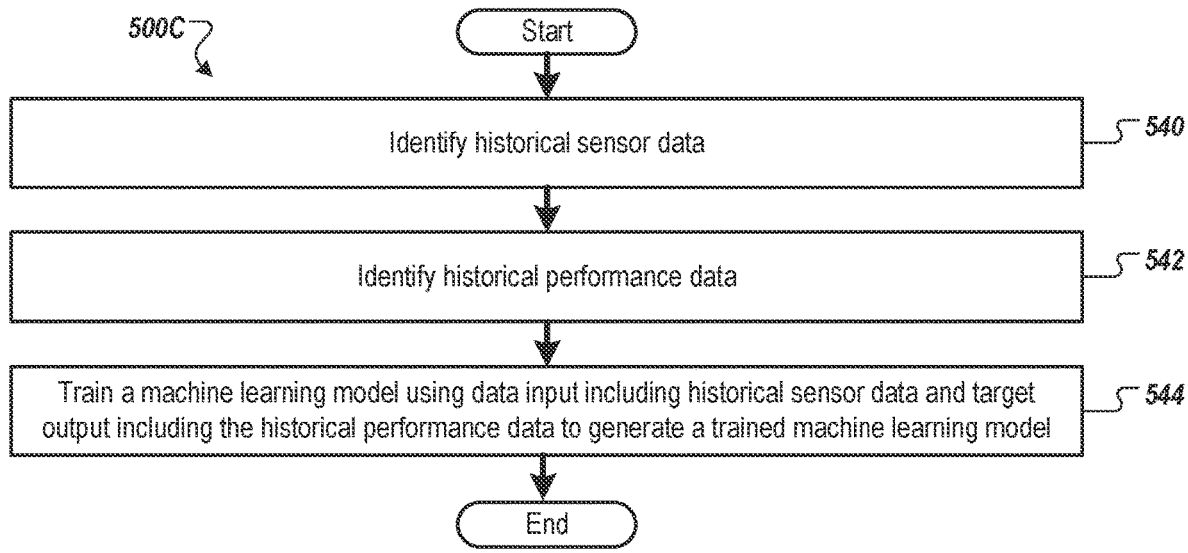
Figure 5D:
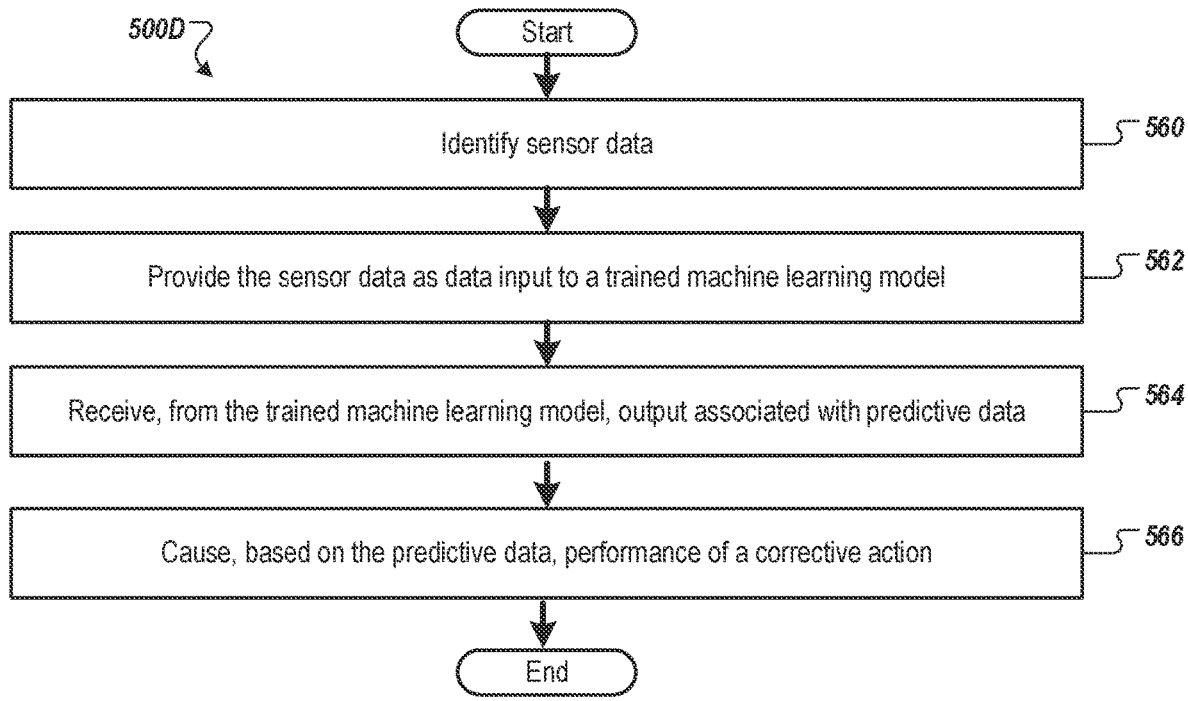

In some embodiments, the processing logic may determine the threshold area using a machine learning model (e.g., see FIGS. 5C-D).

At block 526, responsive to at least a subset of the holes being at least partially clogged, flow continues to block 528. At block 526, responsive to at least a subset of the holes not being at least partially clogged, flow ends.

At block 528, the processing logic causes a corrective action associated with the substrate processing equipment part to be performed based on the at least a subset of the holes that are at least partially clogged and flow returns to block 520. The corrective action may include providing an alert, causing a cleaning action, causing a repairing action, causing replacement, determining a predicted end of life of the substrate processing equipment part, etc.

Blocks 520-528 may be repeated until the holes are not at least partially logged. In some embodiments, based on the number of corrective actions (e.g., cleaning cycles) until the substrate processing equipment part does not have any holes that are at least partially clogged, the processing logic may predict end of life of the substrate processing equipment part.

In some embodiments, instead of or in addition to identifying a subset of the holes that are at least partially clogged, the processing logic determines foreign material is lodged in one or more of the holes, determines one or more of the holes have been enlarged, etc.

FIG. 5C is a method for training a machine learning model (e.g., model 190 of FIG. 1) for determining predictive data (e.g., predictive data 160 of FIG. 1) for clog detection via image analytics.

Referring to FIG. 5C, at block 540 of method 500C, the processing logic identifies historical sensor data (e.g., historical sensor data 144 of FIG. 1, historical input sensor data).

At block 542, the processing logic identifies historical performance data (e.g., historical performance data 154 of FIG. 1, historical output performance data). At least a portion of the historical sensor data and the historical performance data may be associated with new substrate processing equipment parts (e.g., used for benchmarking).

At block 544, the processing logic trains a machine learning model using data input including historical sensor data and target output including the historical performance data to generate a trained machine learning model.

In some embodiments, the historical sensor data of block 540 includes historical images of historical substrate processing equipment parts and the historical performance data of block 542 corresponds to historical substrate processing equipment parts. The historical performance data may be associated with substrate quality, such as metrology data of substrates, substrate throughput, substrate defects, etc. The historical performance data may be associated with quality of the substrate processing equipment part, such as flow test data, (e.g., flowing gas through the holes of the substrate processing equipment part), metrology data of the substrate processing equipment part, time of failure of substrate processing equipment part, etc. At block 544, the machine learning model may be trained using data input including the historical images and target output including the historical performance data to generate a trained machine learning model configured to identify a threshold area based on an image (e.g., image of block 520 of FIG. 5B). At block 524 of FIG. 5B, processing logic may use the threshold area identified via the trained machine learning model to identify holes that are at least partially clogged (e.g., compare area of the hole determined at block 522 to threshold area determined via trained machine learning model).

In some embodiments, the historical sensor data of block 540 includes historical images of historical substrate processing equipment parts and the historical performance data of block 542 includes historical hole maps corresponding to the historical substrate processing equipment parts. At block 544, the machine learning model may be trained using data input including the historical images and target output including the historical hole maps to generate a trained machine learning model configured to predict performance data (e.g., performance data of the substrate processing equipment part) based on an image (e.g., image of block 520 of FIG. 5B). Responsive to the predicted performance data meeting a first threshold, the processing logic may cause a corrective action (e.g., clean, repair, or replace the substrate processing equipment part). Responsive to the predicted performance data meeting a second threshold, the processing logic may cause the substrate processing equipment part to be used in the substrate processing system.

FIG. 5D is a method 500D for using a trained machine learning model (e.g., model 190 of FIG. 1) for clog detection to cause performance of a corrective action.

Referring to FIG. 5D, at block 560 of method 500D, the processing logic identifies sensor data. In some embodiments, the sensor data of block 540 includes an image of a substrate processing equipment part.

At block 562, the processing logic provides the sensor data as data input to a trained machine learning model (e.g., trained via block 544 of FIG. 5C).

At block 564, the processing logic receives, from the trained machine learning model, output associated with predictive data.

At block 566, the processing logic causes, based on the predictive data, performance of a corrective action.

In some embodiments, the sensor data is an image of a substrate processing equipment part and the trained machine learning model of block 562 was trained using data input including historical images of substrate processing equipment parts and target output including historical performance data (e.g., substrate quality using the historical substrate processing equipment parts). The predictive data of block 564 may be associated with a threshold area. In some embodiments, at block 566, the processing logic compares the hole areas of block 522 of FIG. 5B to the threshold area to identify holes that are at least partially clogged at block 524 of FIG. 5B to then cause a corrective action (e.g., see block 528 of FIG. 5B) to clean, repair, or replace the substrate processing equipment part (e.g., so that the hole areas meet the threshold area).

In some embodiments, the sensor data is an image of a substrate processing equipment part and the trained machine learning model of block 562 was trained using data input including historical images of substrate processing equipment parts and target output including historical performance data that includes historical hole maps corresponding to the historical substrate processing equipment parts. The predictive data of block 564 may be associated with predicted performance data (e.g., performance data of the substrate processing equipment part) based on the image (e.g., image of block 520 of FIG. 5B). Responsive to the predicted performance data meeting a first threshold, the processing logic may cause a corrective action (e.g., clean, repair, or replace the substrate processing equipment part). Responsive to the predicted performance data meeting a second threshold, the processing logic may cause the substrate processing equipment part to be used in the substrate processing system.

Figure 6:
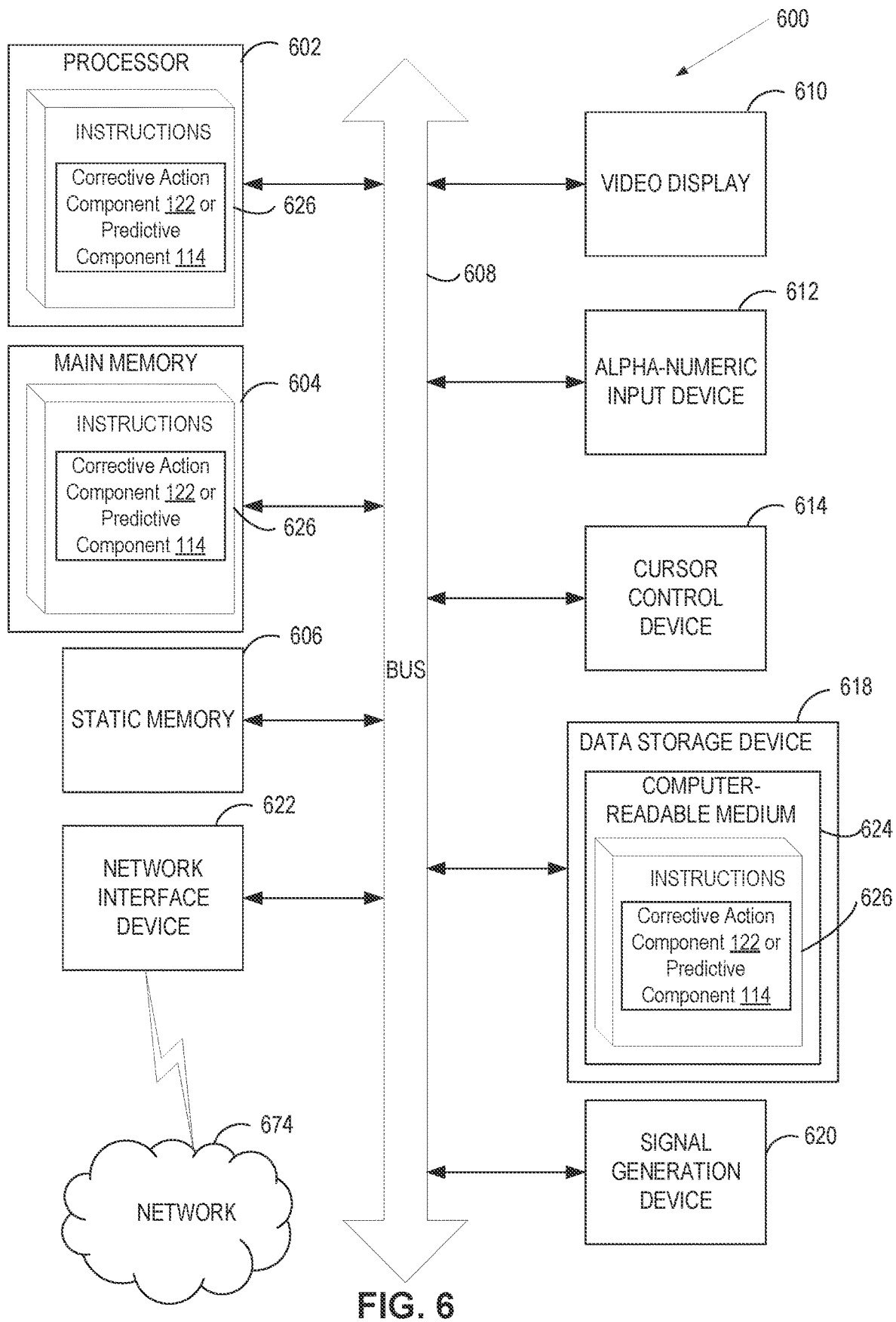
FIG. 6 is a block diagram illustrating a computer system, according to certain embodiments.

FIG. 6 is a block diagram illustrating a computer system 600, according to certain embodiments. In some embodiments, the computer system 600 is one or more of client device 120, predictive system 110, server machine 170, server machine 180, predictive server 112, or image capturing device 400.

In some embodiments, computer system 600 is connected (e.g., via a network, such as a Local Area Network (LAN), an intranet, an extranet, or the Internet) to other computer systems. In some embodiments, computer system 600 operates in the capacity of a server or a client computer in a client-server environment, or as a peer computer in a peer-to-peer or distributed network environment. In some embodiments, computer system 600 is provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 includes a processing device 602, a volatile memory 604 (e.g., Random Access Memory (RAM)), a non-volatile memory 606 (e.g., Read-Only Memory (ROM) or Electrically-Erasable Programmable ROM (EEPROM)), and a data storage device 616, which communicate with each other via a bus 608.

In some embodiments, processing device 602 is provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

In some embodiments, computer system 600 further includes a network interface device 622 (e.g., coupled to network 674). In some embodiments, computer system 600 also includes a video display unit 610 (e.g., an LCD), an alphanumeric input device 612 (e.g., a keyboard), a cursor control device 614 (e.g., a mouse), and a signal generation device 620.

In some implementations, data storage device 616 includes a non-transitory computer-readable storage medium 624 on which store instructions 626 encoding any one or more of the methods or functions described herein, including instructions encoding components of FIG. 1 (e.g., corrective action component 122, predictive component 114, etc.) and for implementing methods described herein (e.g., one or more of methods 500A-D).

In some embodiments, instructions 626 also reside, completely or partially, within volatile memory 604 and/or within processing device 602 during execution thereof by computer system 600, hence, in some embodiments, volatile memory 604 and processing device 602 also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In some embodiments, the methods, components, and features described herein are implemented by discrete hardware components or are integrated in the functionality of other hardware components such as ASICS, FPGAs, DSPs or similar devices. In some embodiments, the methods, components, and features are implemented by firmware modules or functional circuitry within hardware devices. In some embodiments, the methods, components, and features are implemented in any combination of hardware devices and computer program components, or in computer programs.

Unless specifically stated otherwise, terms such as "identifying," "determining," "masking," "resizing," "performing," "converting," "applying," "associating," "comparing," "training," "causing," "receiving," "providing," "obtaining," "updating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. In some embodiments, the terms "first," "second," "third," "fourth," etc. as used herein are meant as labels to distinguish among different elements and do not have an ordinal meaning according to their numerical designation.

Examples described herein also relate to an apparatus for performing the methods described herein. In some embodiments, this apparatus is specially constructed for performing the methods described herein, or includes a general purpose computer system selectively programmed by a computer program stored in the computer system. Such a computer program is stored in a computer-readable tangible storage medium.

The methods and illustrative examples described herein are not inherently related to any particular computer or other apparatus. In some embodiments, various general purpose systems are used in accordance with the teachings described herein. In some embodiments, a more specialized apparatus is constructed to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   identifying an image of a substrate processing equipment part that forms a plurality of holes;
   determining, by a processing device based on the image, a clockwise holes spiral and an anti-clockwise holes spiral of the plurality of holes, a corresponding neighboring angular distance of each of the plurality of holes, and a corresponding area of each of the plurality of holes; and
   identifying, by the processing device, a first subset of the plurality of holes in at least one of the clockwise holes spiral or the anti-clockwise holes spiral that are at least partially clogged based on at least one of the corresponding neighboring angular distance or the corresponding area of each of the plurality of holes, wherein a corrective action associated with the substrate processing equipment part is to be performed based on the first subset of the plurality of holes that are at least partially clogged.

2. The method of claim 1, wherein the image is captured of a first surface of the substrate processing equipment part while providing light towards a second surface of the substrate processing equipment part that is opposite the first surface, wherein the light passes through at least a second subset of the plurality of holes.

3. The method of claim 1 further comprising:
   masking an area from the image to enhance visibility of the plurality of holes formed by the substrate processing equipment part and to reduce background errors; and
   resizing the image to a predetermined size to remove scale factors.

4. The method of claim 1 further comprising:
   performing contour detection to detect a projection of each of the plurality of holes and to localize an image foreground;
   determining a corresponding centroid and the corresponding area of each of the plurality of holes;
   determining corresponding Cartesian coordinates of each of the plurality of holes;
   determining a part centroid of the substrate processing equipment part based on the corresponding centroid of each of the plurality of holes;
   converting, based on the part centroid, the corresponding Cartesian coordinates of each of the plurality of holes into corresponding polar coordinates; and
   applying radial magnification of a corresponding radial distance of the corresponding polar coordinates of each of the plurality of holes to separate the clockwise holes spiral and the anti-clockwise holes spiral.

5. The method of claim 1, wherein the identifying of the first subset of the plurality of holes that are at least partially clogged comprises:
   identifying corresponding hole neighbors and corresponding polar coordinates of each of the plurality of holes;
   associating each of the plurality of holes with the clockwise holes spiral or the anti-clockwise holes spiral using a corresponding nearest neighbor distance; and
   comparing the corresponding neighboring angular distance of each of the plurality of holes with a threshold neighboring angular distance to identify clogged holes.

6. The method of claim 1, wherein the identifying of the first subset of the plurality of holes that are at least partially clogged comprises comparing the corresponding area of each of the plurality of holes with a threshold area to identify partially clogged holes.

7. The method of claim 6 further comprising:
   identifying historical images of historical substrate processing equipment parts;
   identifying historical performance data corresponding to historical substrate processing equipment parts; and
   training a machine learning model using data input comprising the historical images and target output comprising the historical performance data to generate a trained machine learning model configured to identify the threshold area.

8. The method of claim 1 further comprising:
   identifying historical images of historical substrate processing equipment parts;
   identifying historical hole maps corresponding to the historical substrate processing equipment parts; and
   training a machine learning model using data input comprising the historical images and target output comprising the historical hole maps to generate a trained machine learning model configured to predict performance data based on the image, wherein the corrective action is further based on the performance data.

9. A non-transitory computer-readable storage medium storing instructions which, when executed, cause a processing device to perform operations comprising:
   identifying an image of a substrate processing equipment part that forms a plurality of holes;
   determining, based on the image, a clockwise holes spiral and an anti-clockwise holes spiral of the plurality of holes, a corresponding neighboring angular distance of each of the plurality of holes, and a corresponding area of each of the plurality of holes; and
   identifying a first subset of the plurality of holes in at least one of the clockwise holes spiral or the anti-clockwise holes spiral that are at least partially clogged based on at least one of the corresponding neighboring angular distance or the corresponding area of each of the plurality of holes, wherein a corrective action associated with the substrate processing equipment part is to be performed based on the first subset of the plurality of holes that are at least partially clogged.

10. The non-transitory computer-readable storage medium of claim 9, wherein the image is captured of a first surface of the substrate processing equipment part while providing light towards a second surface of the substrate processing equipment part that is opposite the first surface, wherein the light passes through at least a second subset of the plurality of holes.

11. The non-transitory computer-readable storage medium of claim 9, the operations further comprising:

masking an area from the image to enhance visibility of the plurality of holes formed by the substrate processing equipment part and to reduce background errors; and resizing the image to a predetermined size to remove scale factors.

12. The non-transitory computer-readable storage medium of claim 9, the operations further comprising:

performing contour detection to detect a projection of each of the plurality of holes and to localize an image foreground;

determining a corresponding centroid and the corresponding area of each of the plurality of holes;

determining corresponding Cartesian coordinates of each of the plurality of holes;

determining a part centroid of the substrate processing equipment part based on the corresponding centroid of each of the plurality of holes;

converting, based on the part centroid, the corresponding Cartesian coordinates of each of the plurality of holes into corresponding polar coordinates; and applying radial magnification of a corresponding radial distance of the corresponding polar coordinates of each of the plurality of holes to separate the clockwise holes spiral and the anti-clockwise holes spiral.

13. The non-transitory computer-readable storage medium of claim 9, wherein the identifying of the first subset of the plurality of holes that are at least partially clogged comprises:

identifying corresponding hole neighbors and corresponding polar coordinates of each of the plurality of holes;

associating each of the plurality of holes with the clockwise holes spiral or the anti-clockwise holes spiral using a corresponding nearest neighbor distance; and comparing the corresponding neighboring angular distance of each of the plurality of holes with a threshold neighboring angular distance to identify clogged holes.

14. The non-transitory computer-readable storage medium of claim 9, wherein the identifying of the first subset of the plurality of holes that are at least partially clogged comprises comparing the corresponding area of each of the plurality of holes with a threshold area to identify partially clogged holes.

15. The non-transitory computer-readable storage medium of claim 14, the operations further comprising:

identifying historical images of historical substrate processing equipment parts;

identifying historical performance data corresponding to historical substrate processing equipment parts; and training a machine learning model using data input comprising the historical images and target output comprising the historical performance data to generate a trained machine learning model configured to identify the threshold area.

16. The non-transitory computer-readable storage medium of claim 9, the operations further comprising:

identifying historical images of historical substrate processing equipment parts;

identifying historical hole maps corresponding to the historical substrate processing equipment parts; and training a machine learning model using data input comprising the historical images and target output comprising the historical hole maps to generate a trained machine learning model configured to predict performance data based on the image, wherein the corrective action is further based on the performance data.

17. A system comprising:

a memory; and a processing device coupled to the memory, the processing device to:

identify an image of a substrate processing equipment part that forms a plurality of holes;

determine, based on the image, a clockwise holes spiral and an anti-clockwise holes spiral of the plurality of holes, a corresponding neighboring angular distance of each of the plurality of holes, and a corresponding area of each of the plurality of holes; and identify a first subset of the plurality of holes in at least one of the clockwise holes spiral or the anti-clockwise holes spiral that are at least partially clogged based on at least one of the corresponding neighboring angular distance or the corresponding area of each of the plurality of holes, wherein a corrective action associated with the substrate processing equipment part is to be performed based on the first subset of the plurality of holes that are at least partially clogged.

18. The system of claim 17, wherein the image is captured of a first surface of the substrate processing equipment part while providing light towards a second surface of the substrate processing equipment part that is opposite the first surface, wherein the light passes through at least a second subset of the plurality of holes.

19. The system of claim 17, wherein the processing device is further to:

mask an area from the image to enhance visibility of the plurality of holes formed by the substrate processing equipment part and to reduce background errors; and resize the image to a predetermined size to remove scale factors.

20. The system of claim 17, wherein the processing device is further to:

perform contour detection to detect a projection of each of the plurality of holes and to localize an image foreground;

determine a corresponding centroid and the corresponding area of each of the plurality of holes;

determine corresponding Cartesian coordinates of each of the plurality of holes;

determine a part centroid of the substrate processing equipment part based on the corresponding centroid of each of the plurality of holes;

convert, based on the part centroid, the corresponding Cartesian coordinates of each of the plurality of holes into corresponding polar coordinates; and apply radial magnification of a corresponding radial distance of the corresponding polar coordinates of each of the plurality of holes to separate the clockwise holes spiral and the anti-clockwise holes spiral.

* * * * *